United States Patent
Salois et al.

(10) Patent No.: US 11,148,816 B2
(45) Date of Patent: Oct. 19, 2021

(54) ADJUSTABLE LEG RESTRAINTS FOR EJECTION SEATS

(71) Applicant: Goodrich Corporation, Charlotte, NC (US)

(72) Inventors: Matthew D. Salois, Berwick, ME (US); Jeff Benjamin, Colorado Springs, CO (US)

(73) Assignee: Goodrich Corporation, Charlotte, NC (US)

( * ) Notice: Subject to any disclaimer, the term of this patent is extended or adjusted under 35 U.S.C. 154(b) by 344 days.

(21) Appl. No.: 16/217,320

(22) Filed: Dec. 12, 2018

(65) Prior Publication Data

US 2020/0189756 A1    Jun. 18, 2020

(51) Int. Cl.
*B64D 25/04* (2006.01)
*B64D 11/06* (2006.01)
*B64D 25/10* (2006.01)

(52) U.S. Cl.
CPC .......... *B64D 25/04* (2013.01); *B64D 11/0616* (2014.12); *B64D 25/10* (2013.01)

(58) Field of Classification Search
CPC ........ B64D 25/04; B64D 25/10; B64D 25/02; B64D 25/00; B64D 25/06; B64D 25/08; B64D 11/0616; B64D 11/0689
See application file for complete search history.

(56) References Cited

U.S. PATENT DOCUMENTS

| | | | |
|---|---|---|---|
| 2,665,089 A * | 1/1954 | Martin | B64D 25/10 244/122 AE |
| 2,709,557 A | 5/1955 | Replogle et al. | |
| 2,765,130 A | 10/1956 | Replogle et al. | |
| 2,829,850 A | 4/1958 | Culver | |
| 10,569,890 B2 * | 2/2020 | Moeller | B60R 21/207 |
| 2015/0166185 A1 * | 6/2015 | Oleson | B60N 2/4235 297/216.1 |
| 2019/0308528 A1 * | 10/2019 | Van Zyl | B60N 2/643 |

FOREIGN PATENT DOCUMENTS

| | | | | |
|---|---|---|---|---|
| CA | 2886825 A1 * | 10/2016 | | B62J 27/00 |
| GB | 704332 | 2/1954 | | |
| GB | 723974 | 2/1955 | | |
| GB | 724261 | 2/1955 | | |
| GB | 724261 A * | 2/1955 | | B64D 25/10 |
| GB | 831472 A * | 3/1960 | | B64D 25/02 |

* cited by examiner

*Primary Examiner* — Richard R. Green
*Assistant Examiner* — Arfan Y. Sinaki
(74) *Attorney, Agent, or Firm* — Snell & Wilmer L.L.P.

(57) ABSTRACT

An adjustable leg restraint for an ejection seat may be configured to translate between an extended state and a nonextended state. The adjustable leg restraint may include a leg located proximate a side panel of the ejection seat. An extension flange may be coupled to the leg guard. The extension flange may be configured to translate the leg guard relative to the side panel of the ejection seat.

19 Claims, 10 Drawing Sheets

ADJUSTABLE LEG RESTRAINTS FOR EJECTION SEATS

FIELD

The present disclosure relates to ejection seats, and more specifically, to adjustable leg restraints for ejection seats.

BACKGROUND

Ejection seats are designed to expel pilots from an aircraft. Ejection seats are typically located under an aircraft canopy. Upon activation of the ejection sequence, the canopy may be removed from the path of the ejection seat via a canopy jettison system or a canopy fracture system. A canopy piercer, configured to fracture the canopy should the jettison system and/or fracture system fail, may be mounted on the headrest of the ejection seat. Additionally, some ejection systems may use a seat-mounted canopy piercer as the primary and/or only mode of canopy removal. Fracturing the canopy via the seat-mounted canopy piercer may expose the ejection seat occupant to hazard, as the fracturing pattern of the canopy is unpredictable and may not propagate over the entire ejection seat. For example, portions of the canopy may remain over and contact the occupant's legs during expulsion of the ejection seat

SUMMARY

An adjustable leg restraint for an ejection seat is disclosed herein. In accordance with various embodiments, the adjustable leg restraint may comprise a leg guard and an extension flange coupled to the leg guard and configured to translate the leg guard relative to a side panel of the ejection seat.

In various embodiments, a guide flange may be coupled to the leg guard. A stop may be located through an interior track defined by the guide flange.

In various embodiments, a restraint pin may be located through an opening defined by the extension flange. In various embodiments, a spring may be configured to apply a biasing force to the extension flange. In various embodiments, an actuator may be configured to remove the restraint pin from a pin channel defined by the extension flange.

In various embodiments, a leg guard actuator may be operably coupled to the extension flange. The leg guard actuator may be configured to drive a translation of the extension flange. A control panel may include a controller operably coupled to the leg guard actuator.

An ejection seat is also disclosed herein. In accordance with various embodiments, the ejection seat may comprise a seat pan, a side panel located adjacent the seat pan, and an adjustable leg restraint coupled to the side panel. The adjustable leg restraint may comprise a leg guard and an extension flange coupled to the leg guard and configured to translate the leg guard relative to the side panel.

In various embodiments, a guide flange may be coupled to the leg guard, and a stop may be coupled to the side panel. The stop may be located through an interior track defined by the guide flange. In various embodiments, the leg guard may comprise a shark fin shape and define a plurality of orifices.

In various embodiments, a restraint pin may be located through an opening defined by the extension flange. In various embodiments, the side panel may define a plurality of channels configured to receive the restraint pin.

In various embodiments, a spring may be configured to apply a biasing force to the extension flange. In various embodiments, an actuator may be configured to remove the restraint pin from a pin channel defined by the extension flange. In various embodiments, an ejection handle may be configured to activate an ejection sequence. The actuator may be configured to remove the restraint pin in response to an actuation of the ejection handle.

In various embodiments, a leg guard actuator may be operably coupled to the extension flange. The leg guard actuator may be configured to drive a translation of the extension flange. A rail may be coupled to the seat pan and configured to support a translation of the seat pan along the rail. A seat pan actuator may be operably coupled to the seat pan. The seat pan actuator may be configured to drive the translation of the seat pan along the rail. The leg guard actuator may be configured to translate the extension flange in response to the translation of the seat pan along the rail. In various embodiments, a control panel may include a controller operably coupled to the seat pan actuator.

An ejection seat configured to be expelled from a cockpit is also disclosed herein. In accordance with various embodiments, the ejection seat may comprise a seat pan, a side panel located adjacent the seat pan, and an adjustable leg restraint coupled to the side panel. The adjustable leg restraint may comprise a leg guard coupled to the side panel via a pivot joint, and a torsion spring operationally coupled to the leg guard. The torsion spring may be configured to rotate the leg guard about the pivot joint.

In various embodiments, a restraint pin may be configured to limit rotation of the leg guard about the pivot joint. In various embodiments, the restraint pin may be coupled to a floor of the cockpit.

In various embodiments, the leg guard may comprise a shark fin shape and define a plurality of orifices.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the following illustrative figures. In the following figures, like reference numbers refer to similar elements and steps throughout the figures.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosures, it should be understood that other embodiments may be realized and that logical changes and adaptations in design and construction may be made in accordance with this disclosure and the teachings herein. Thus, the detailed description herein is presented for purposes of illustration only and not of limitation.

The scope of the disclosure is defined by the appended claims and their legal equivalents rather than by merely the examples described. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to tacked, attached, fixed, coupled, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts but not necessarily to denote the same or different materials.

Figure 1A:
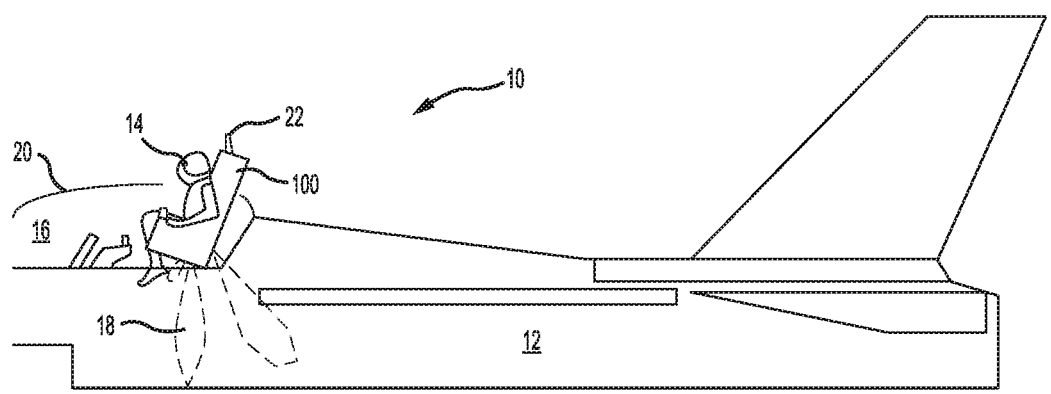
FIG. 1A illustrates an ejection seat being launched from an aircraft cockpit, in accordance with various embodiments.

With reference to FIG. 1A, an aircraft ejection system 10 is shown, in accordance with various embodiments. Aircraft ejection system 10 may be installed in aircraft 12 to expel an ejection seat 100 and an occupant 14 of ejection seat 100 from a cockpit 16 of aircraft 12. Ejection seat 100 may be urged from cockpit 16 by a propulsion system 18. A canopy 20 may be located over cockpit 16. Ejection system 10 may be configured to remove portions of canopy 20 from over occupant 14. For example, ejection system 10 may include a canopy jettison system configured to expel canopy 20 and/or ejection seat 100 may include a canopy piercer 22 mounted proximate a head rest of ejection seat 100. During ejection of ejection seat 100, a portion of canopy 20 may remain over the legs of occupant 14. As described herein, ejection seat 100 may include adjustable leg restraints configured to be extended above the legs of occupant 14, such that as ejection seat 100 is expelled from cockpit 16, the adjustable leg restraints will contact and remove any portions of the canopy 20 remaining over the legs of occupant 14.

Figure 1B:
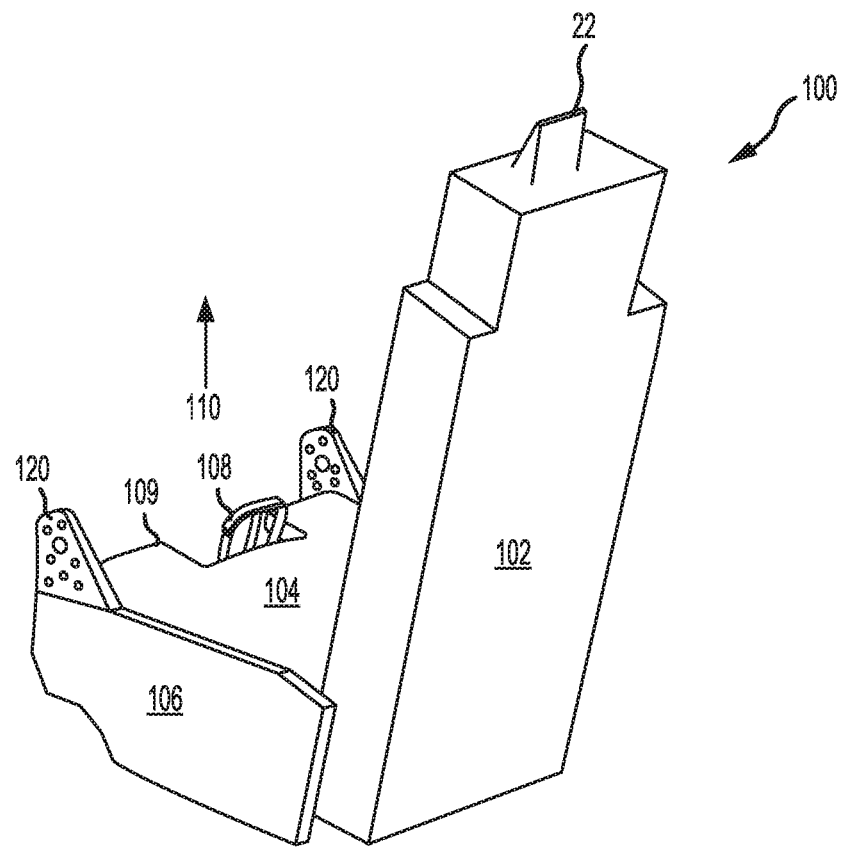
FIG. 1B illustrates a perspective view of an ejection seat having adjustable leg restraints, in accordance with various embodiments.

With reference to FIG. 1B, ejection seat 100 is illustrated, in accordance with various embodiments. Ejection seat 100 includes a seat back 102 and a seat pan 104. Ejection seat 100 further includes a pair of side panels 106 located on opposing sides of seat pan 104. In various embodiments, an ejection handle 108 may be located, for example, proximate a front side 109 of seat pan 104 and approximately half way between opposing side panels 106. Front side 109 of seat pan 104 is generally opposite seat back 102. While FIG. 1B shows ejection handle 108 as located at front side 109 and between side panels 106, it is further contemplated and understood that ejection handle 108 may be located anywhere that is accessible to an occupant of ejection seat 100. Ejection handle 108 may be configured to initiate an ejection sequence upon actuation. For example, occupant 14 (with momentary reference to FIG. 1A) pulling ejection handle 108 in the direction of arrow 110 by may cause ejection seat 100 to be expelled from cockpit 16. In various embodiments, ejection seat 100 may include a pair of adjustable leg restraints 120 located at opposing sides of seat pan 104. Adjustable leg restraints 120 may be located proximate and/or coupled to side panels 106 of ejection seat 100. As described in further detail below, adjustable leg restraints 120 may be configured to be extended above the legs of an occupant of ejection seat 100. Stated differently, adjustable leg restraints 120 may be configured to translate away from side panels 106 (e.g., in the direction of arrow 110).

Figure 2A:
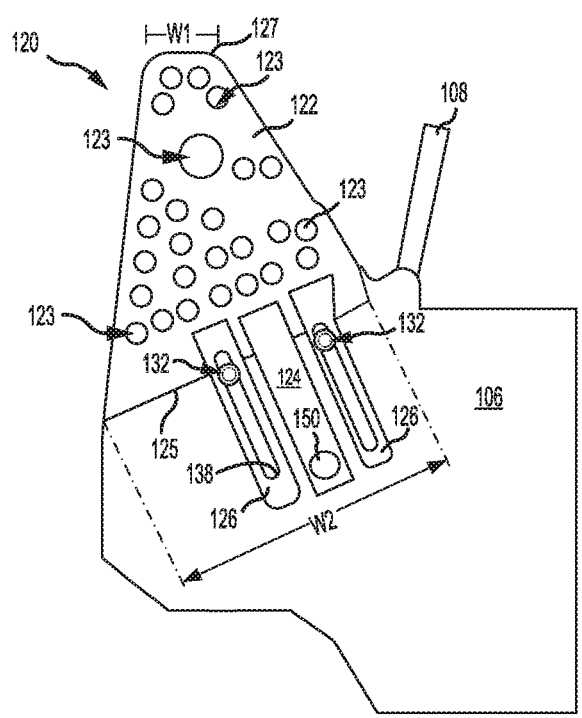
FIGS. 2A and 2B illustrate, respectively, a side view and a cross-section view of an adjustable leg restraint in a nonextended state, in accordance with various embodiments.

With reference to FIG. 2A, an adjustable leg restraint 120 is illustrated in a nonextended state, in accordance with various embodiments. Adjustable leg restraint 120 may comprises a leg guard 122. In various embodiments, leg guard 122 may comprise a "shark fin" shape. Stated differently, leg guard 122 may comprise a generally triangular or frustopyramidal shape, wherein a width W1 of leg guard 122, as measured at an end 127 of leg guard 122 opposite side panel 106, is less than a width W2 of leg guard 122, as measured at a surface 125 of leg guard 122 proximate side panel 106. The shark fin shape of leg guard 122 may be configured to allow leg guard 122 to more easily pierce canopy 20, with momentary reference to FIG. 1A, during expulsion of ejection seat 100. Leg guard 122 may also serve to limit outward movement, or spreading, of the occupant's legs during ejection. In various embodiments, leg guard 122 may define a plurality of openings or orifices 123. Orifices 123 extend completing through leg guard 122 to allow air to flow through orifices 123 during ejection, thereby reducing the force or pressure exerted on leg guard 122 during ejection.

In various embodiments, adjustable leg restraint 120 further includes an extension flange 124 and one or more guide flange(s) 126. Extension flange 124 and guide flanges 126 may be coupled to leg guard 122. Extension flange 124 and guide flanges 126 may be coupled to leg guard 122 via a fastener (e.g., a rivet, screw, clip, nut and bolt, etc.), adhesive, or any other suitable securement device. In various embodiments, extension flange 124 and guide flanges 126 may be integral to leg guard 122.

Figure 2B:
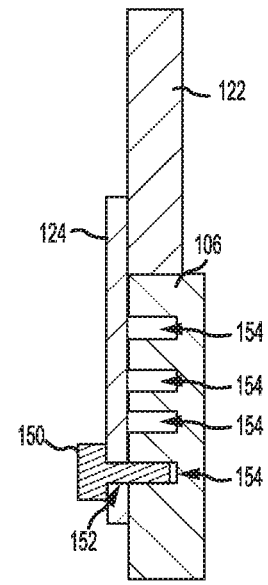

Referring to FIG. 2B, a cross section through extension flange 124 of adjustable leg restraint 120 is illustrated, in accordance with various embodiments. In various embodiments, a restraint pin 150 may be located through an opening 152 defined by extension flange 124. Side panel 106 defines a plurality of channels 154 configured to receive restraint pin 150. Locating restraint pin 150 in a channel 154 tends to limit translation of extension flange 124 relative to side panel 106.

Figure 3A:
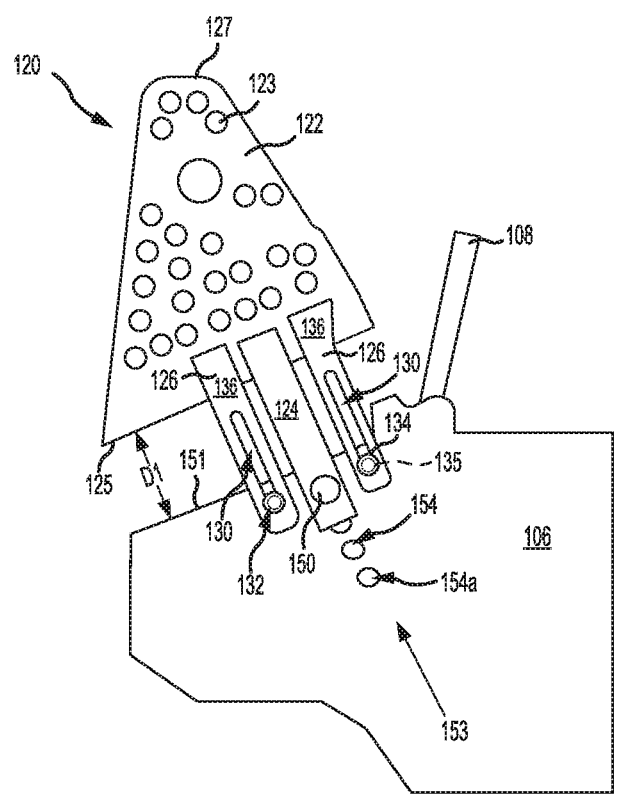
FIGS. 3A and 3B illustrate, respectively, a side view and a cross-section view of an adjustable leg restraint in an extended state, in accordance with various embodiments.
Figure 3B:
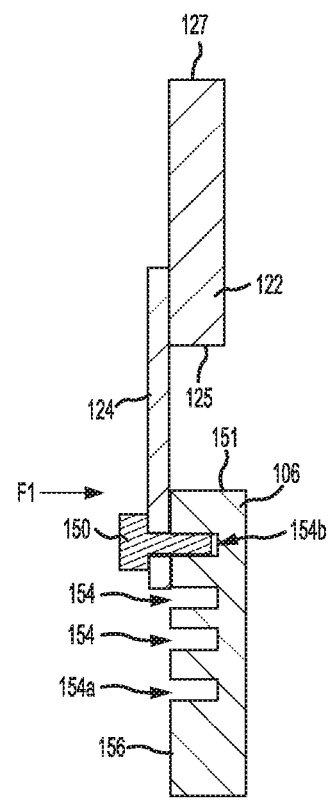

With reference to FIGS. 3A and 3B, adjustable leg restraint 120 is illustrated in an extended state, in accordance with various embodiments. In various embodiments, adjustable leg restraint 120 is configured such that a distance D1 between leg guard 122 and side panel 106 may be adjusted by translating leg guard 122 away from surface 151 of side panel 106 (i.e., in a direction of arrow 153). Leg guard 122 may be translated in the direction of arrow 153 by removing restraint pin 150 from a first channel 154 (e.g. channel 154a), adjusting/translating leg guard 122 to the desired distance D1, and inserting restraint pin 150 into a second channel 154 (e.g., channel 154b) associated with and/or closest to the desired distance D1. With combined reference to FIGS. 1A and 3A, occupant 14 may translate leg guard 122 to a desired distance D1, wherein end 127 is above the leg of occupant 14. Locating end 127 above the leg of occupant 14, allows leg guard 122 to contact any portions of canopy 20 remaining over the occupant's leg prior to the leg contacting the canopy. Stated differently, in the extended state, leg guard 122 may remove any remaining portions of canopy 20 from the path of the occupant's legs.

Returning to FIGS. 3A and 3B, in various embodiments, restraint pin 150 may be a spring-loaded plunger. For example, restraint pin 150 may experience a biasing force F1 configured to drive restraint pin 150 toward surface 156 of side panel 106. In this regard, to remove restraint pin 150 from channel 154, an occupant pulls restraint pin 150 away from surface 156 (i.e., applies a force to restraint pin 150 greater than biasing force F1). Upon the occupant releasing restraint pin 150, restraint pin 150 will translate in the direction of biasing force F1. Biasing force F1 may reduce occurrences of restraint pin 150 inadvertently translating out of channel 154 and may simplify adjusting leg guard 122 to desired distance D1, as restraint pin 150 will automatically translate into a channel 154 when surface 156 is no longer contacting restraint pin 150 (i.e., when restraint pin 150 is aligned with a channel 154).

In various embodiments, guide flanges 126 may each define an interior track 130. A stud or stop 132 may be located through interior track 130. In various embodiments, stop 132 may comprise a head portion 134 and a shaft portion 135. Shaft portion 135 is located through interior track 130 and may be coupled to side panel 106. Head portion 134 is located over a surface 136 of guide flange 126. In this regard, guide flange 126 is located between head portion 134 and side panel 106. Guide flange 126 and stop 132 may be configured to limit movement of leg guard 122. For example, head portion 134 may be configured to contact surface 136 of guide flange 126, thereby generating an interference between head portion 134 and guide flange 126 that limits translation of guide flange 126 (and thus leg guard 122) in a horizontal direction (i.e., in a direction perpendicular to surface 156 of side panel 106). Additionally, stop 132 may be configured to contact end 138 (FIG. 2A) of interior track 130, thereby generating an interference between shaft portion 135 and end 138 that limits translation of guide flange 126 (and thus leg guard 122) in a generally vertical direction, for example, in the direction of arrow 153.

Figure 4A:
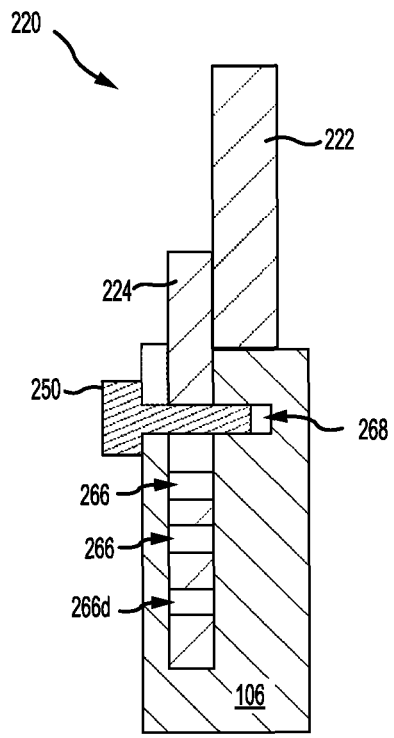
FIGS. 4A and 4B illustrate cross-section views of an adjustable leg restraint in a nonextended state and an extended state, respectively, in accordance with various embodiments.
Figure 4B:
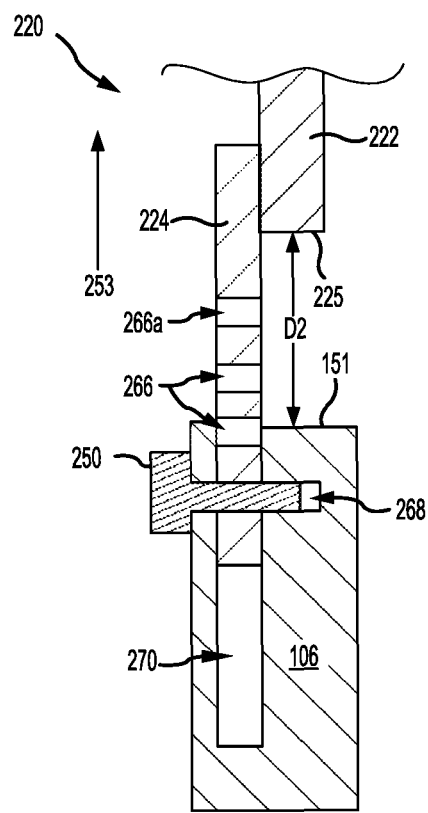

Referring to FIGS. 4A and 4B, cross-section views of an adjustable leg restraint 220 in a nonextended state and in an extended state are illustrated, respectively, in accordance with various embodiments. Adjustable leg restraint 220 may include a leg guard 222. Leg guard 222 may be similar to leg guard 122 in FIG. 2A. In various embodiments, leg guard 222 may have a shark fin shape and may define a plurality of openings or orifices, similar to orifices 123. In various embodiments, ejection seat 100 may include adjustable leg restraint 220 in place of adjustable leg restraint 120. An extension flange 224 may be coupled to leg guard 222. Extension flange 224 is configured to translate leg guard 222 relative to side panel 106. Extension flange 224 defines a plurality of orifices 266. Orifices 266 are configured to receive a restraint pin 250, similar to restraint pin 150 in FIG. 3B. Side panel 106 defines a pin channel 268 configured to receive restraint pin 250. In various embodiments, at least a portion of extension flange 224 may be located in a cavity 270 defined by side panel 106.

Adjustable leg restraint 220 is configured such that a distance D2 between surface 225 of leg guard 222 and surface 151 of side panel 106 may be adjusted by translating leg guard 222 away from surface 151 (i.e., in a direction of arrow 253). Leg guard 222 may be translated in the direction of arrow 253 by removing restraint pin 250 from pin channel 268 and a first orifice 266 (e.g. orifice 266a) of extension flange 224, translating leg guard 222 to the desired distance D2, and inserting restraint pin 250 into pin channel 268 and a second orifice 266 (e.g., orifice 266b) associated with the desired distance D2.

Figure 5A:
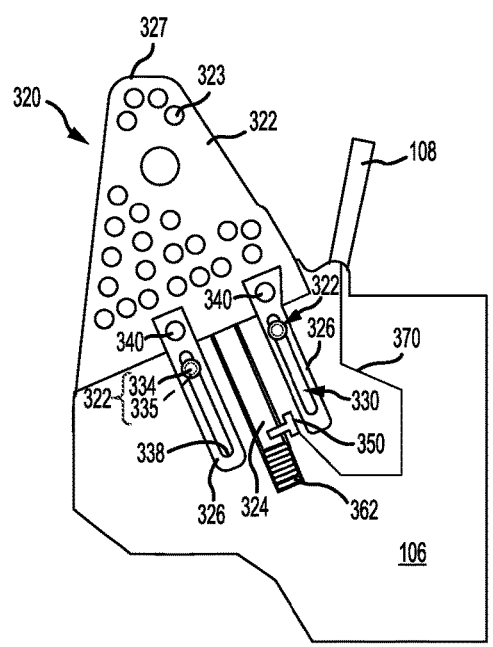
FIGS. 5A and 5B illustrate side views of a spring loaded adjustable leg restraint in a nonextended state and an extended state, respectively, in accordance with various embodiments.
Figure 5B:
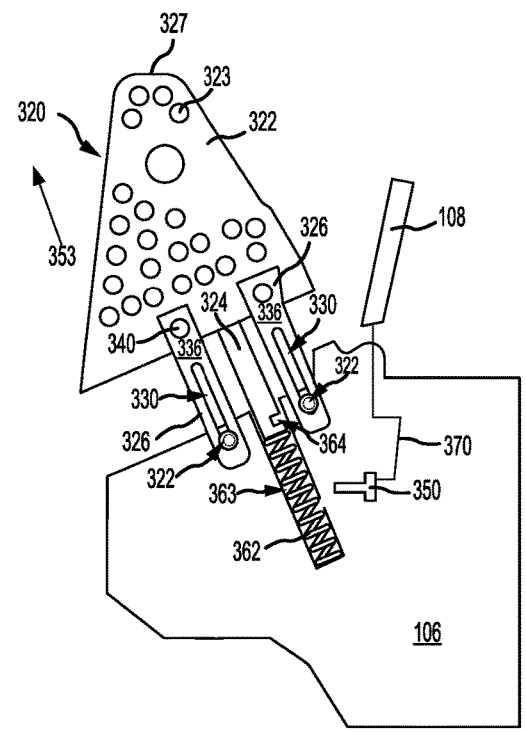

With reference to FIGS. 5A and 5B, an adjustable leg restraint 320 is illustrated in a nonextended state and in an extended state, respectively. Adjustable leg restraint 320 may include a leg guard 322, similar to leg guard 122 in FIG. 2A. In various embodiments, leg guard 322 may have a shark fin shape and may define a plurality of openings or orifices 323. In various embodiments, ejection seat 100, with momentary reference to FIG. 1B, may include adjustable leg restraint 320 in place of adjustable leg restraint 120. Adjustable leg restraint 320 includes an extension flange 324 coupled to leg guard 322. Extension flange 324 may be coupled to leg guard 322 using any suitable securement device (e.g., a pin, rivet, clip, adhesive, etc.). Adjustable leg restraint 320 may include one or more guide flange(s) 326. In various embodiments, guide flanges 326 are coupled to leg guard 322 via fasteners 340. Fasteners 340 may comprise screws, rivets, nuts and bolts, clips, or any other suitable securement device. In various embodiments, extension flange 324 and/or guide flanges 326 may be integral to leg guard 322.

Extension flange 324 is configured to translate leg guard 322 relative to side panel 106. A spring 362 may be located in a spring cavity 363 defined by side panel 106. Spring 362 is configured to apply a biasing force to extension flange 324. In the nonextended state, at least a portion of extension flange 324 may be located in spring cavity 363. In various embodiments, a restraint pin 350 may be located in a pin channel 364 defined by extension flange 324. Restraint pin 350 may be configured to contact extension flange 324, thereby generating an interference that limits translation of extension flange 324 relative to side panel 106. In this regard, adjustable leg restraint 320 is configured to be in the nonextended state when restraint pin 350 is located in pin channel 364. Removing restraint pin 350 from pin channel 364 allows spring 362 to decompress, thereby causing extension flange 324 and leg guard 322 to translate in the direction of arrow 353.

In various embodiments, guide flanges 326 may be configured to limit translation of leg guard 322. In various embodiments, guide flanges 326 may each define an interior track 330. A stud or stop 332 may be located through each interior track 330. In various embodiments, stop 332 may comprise a head portion 334 and a shaft portion 335. Shaft portion 335 is located through interior track 330 and may be coupled to side panel 106. Head portion 334 is located over a surface 336 of guide flange 326. Stated differently, guide flange 326 is located between head portion 334 and side panel 106. Guide flange 326 and stop 332 may be configured to limit movement of leg guard 322. For example, head portion 334 may be contact surface 336, thereby generating an interference between head portion 334 and guide flange 326 that limits horizontal translation of guide flange 326 (and thus leg guard 322). Additionally, stop 332 may contact an end 338 of interior track 330, thereby generating an interference between shaft portion 335 and end 338 that limits translation of guide flange 326 (and thus leg guard 322) in a generally vertical direction, for example, in the direction of arrow 353.

In various embodiments, an actuator 370 may be operationally coupled to restraint pin 350. Actuator 370 may be configured to translate (e.g., pull) restraint pin 350 out of pin channel 364. In various embodiments, actuator 370 may be operationally coupled to ejection handle 108. For example, actuator 370 may be activated and may remove restraint pin 350 from pin channel 364 in response to actuation of ejection handle 108. In this regard, leg guard 322 may translate to an extended state in response to activation of the ejection sequence. In the extended state, an end 327 of leg guard 322 may be located above the leg of the ejection seat occupant. Translating end 327 of leg guard 322 to a position above the seat occupant's leg, upon initiation of the ejection sequence (e.g., upon pulling ejection handle 108), allows leg guard 322 to contact any portions of canopy 20 (FIG. 1A) remaining over the occupant's leg prior to the legs contacting the canopy. Stated differently, in the extended state, leg guard 322 may remove any remaining portions of canopy 20 from the path of the ejection seat occupant's leg.

Figure 6A:
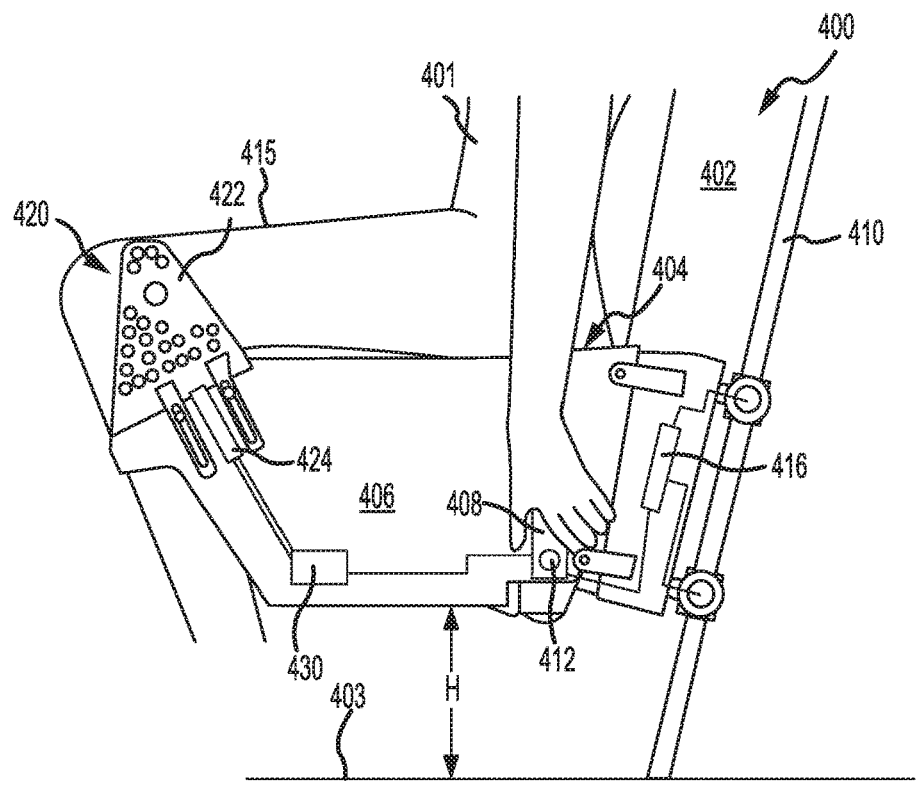
FIGS. 6A and 6B illustrate side views of an automatic adjustable leg restraint in a nonextended state and an extended state, respectively, in accordance with various embodiments.
Figure 6B:
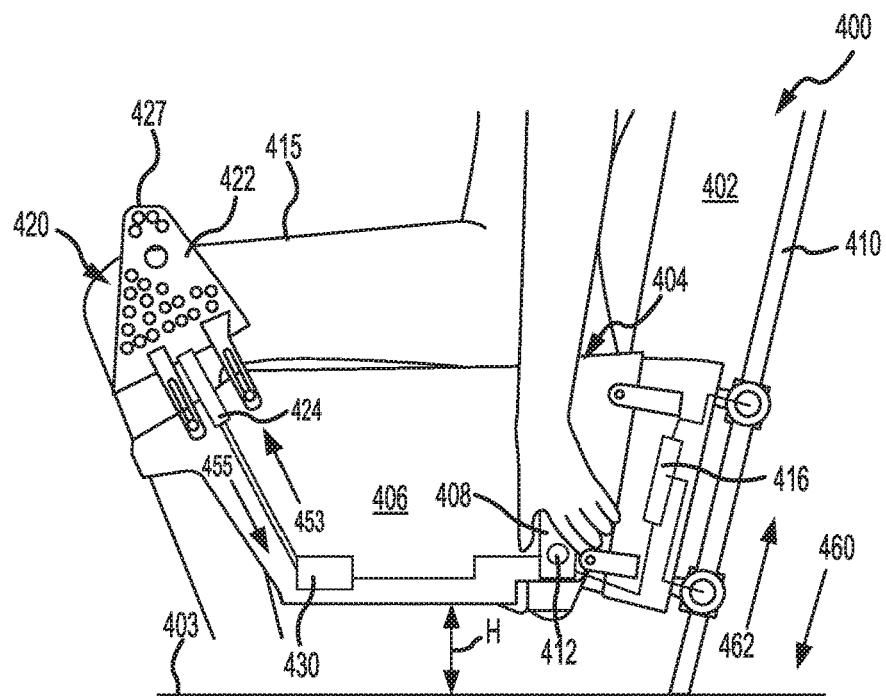

With reference to FIGS. 6A and 6B, an occupant 401 seated in an ejection seat 400 is illustrated, in accordance with various embodiments. Ejection seat 400 includes adjustable leg restraint 420. FIG. 6A shows adjustable leg restraint 420 in a nonextended state. FIG. 6B shows adjustable leg restraint 420 in an extend state. Ejection seat 400 may be similar to ejection seat 100, with momentary reference to FIG. 1A, and may replace ejection seat 100 in ejection system 10. Ejection seat 400 includes a seat back 402 and a seat pan 404 configured to support occupant 401. Ejection seat 400 further includes a pair of side panels 406 located on opposing sides of seat pan 404. An adjustable leg restraint 420 may attached to or located proximate each of the side panels 406. Seat pan 404 may be configured to translate along one or more rails 410. Rails 410 may support translation of seat pan 404, such that occupant 401 may adjust a height H of seat pan 404 relative to an aircraft floor 403 by translating seat pan 404 along rails 410.

In various embodiments, translation and positioning of seat pan 404 may be electromechanically controlled. For example, in various embodiments, ejection seat 400 includes a control panel 408 having one or more button(s), switch(es), knob(s), or other controller(s) 412 in operable communication with a seat pan actuator 416. Seat pan actuator 416 is configured to translate seat pan 404 along rails 410. In this regard, occupant 401 may use controller 412 to adjust height H of seat pan 404. In various embodiments, translation of seat pan 404 may be mechanically, or manually, controlled, such that height H of seat pan 404 may be adjusted by, for example, occupant 401 pulling a lever and manually applying a force to seat pan 104 in the desired direction of translation. Seat pan actuator 416 may drive any mechanism capable of translating seat pan 404 along rails 410. For example, seat pan actuator 416 may drive a push-pull rod with bell crank, a synchronous belt around a pulley, a chain and sprocket, etc., Additionally, while electromechanically powered actuation is illustrated, it is further contemplated and understood that manual means of actuation, for example, a friction interface or a pushbutton lock configured to translate and hold seat pan 404 at various incremental positions along rails 410, may be employed.

Controller 412 may also be configured to control translation of adjustable leg restraint 420. For example, adjustable leg restraint 420 may comprise a leg guard actuator 430 operably coupled to controller 412. Leg guard actuator 430 may be configured to drive translation of a leg guard 422 of adjustable leg restraint 420 relative to side panel 406 and/or relative to seat pan 404. In various embodiments, adjustable leg restraint 420 may include an extension flange 424 coupled to leg guard 422. Leg guard actuator 430 may be operationally coupled to extension flange 424. In this regard, leg guard actuator 430 may provide a motive force configured to translate extension flange 424 relative to side panel 406 and/or relative to seat pan 404. Leg guard actuator 430 may drive any mechanism capable of translating extension flange 424. For example, leg guard actuator 430 may drive a push-pull rod with bell crank, a synchronous belt around a pulley, a chain and sprocket, etc.

Adjustable leg restraint 420 is configured to translate leg guard 422 relative to side panel 406 and/or seat pan 404, in response to seat pan 404 translating along rails 410. In various embodiments, controller 412 may be configured to cause leg guard 422 to translate away from side panel 406 (in the direction of arrow 453) as seat pan 404 translates toward aircraft floor 403 (in the direction of arrow 460), and to cause leg guard 422 to translate toward side panel (in the direction of arrow 455) as seat pan 404 translates away from aircraft floor 403 (in the direction of arrow 462). For example, controller 412 may simultaneously activate leg guard actuator 430 and seat pan actuator 416 to drive translation of seat pan 404 and leg guard 422, respectively. In various embodiments, seat pan actuator 416 may be operationally coupled to leg guard actuator 430, such that electrical or mechanical activation of seat pan actuator 416 causes leg guard actuator 430 to begin translating extension flange 424 and leg guard 422.

Adjustable leg restraint 420 may be configured to extend leg guard 422 based a height of occupant 401. For example, a taller occupant 401 tends to position seat pan 404 closer to aircraft floor 403, which may raise the upper thigh and/or knee of occupant leg 415. Configuring leg guard 422 to translate to an extended state, in response to reducing seat height H, may locate end 427 of leg guard 422 above the longer legs of a taller occupant 401. Locating end 427 above leg 415 may allow leg guard 422 to contact any portions of canopy 20 remaining over leg 415 during expulsion of ejection seat, thereby removing the remaining canopy portions from the path of leg 415.

Figure 7A:
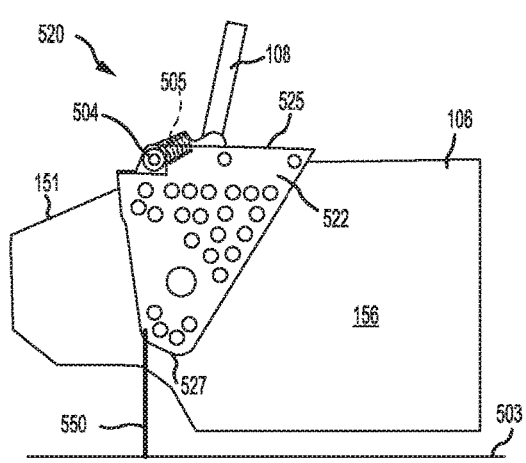
FIG. 7A illustrates a side view of an adjustable leg restraint in a nonextended state, in accordance with various embodiments.
Figure 7B:
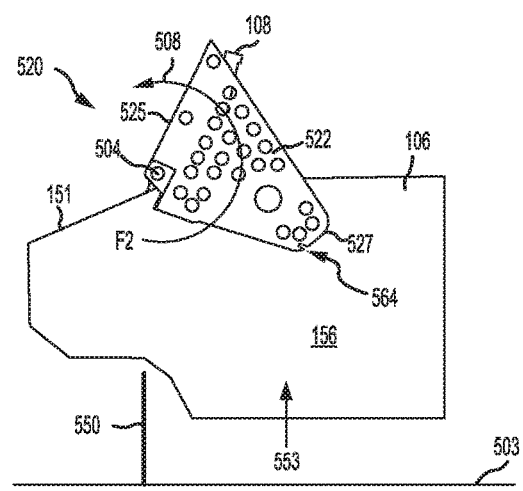
FIG. 7B illustrates a side view of an adjustable leg restraint in a partially extended state, in accordance with various embodiments.
Figure 7C:
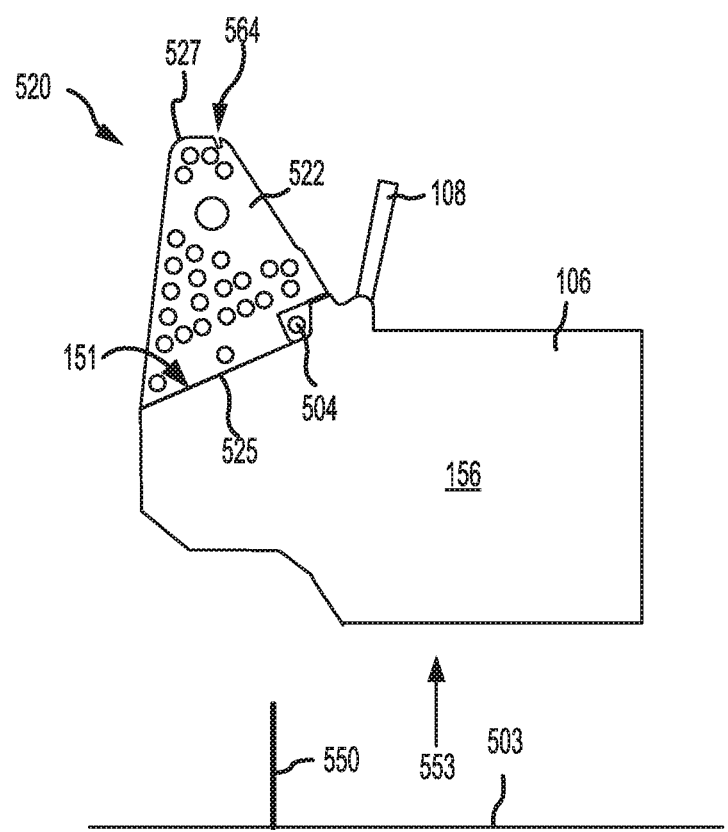
FIG. 7C illustrates a side view of an adjustable leg restraint in an extended state, in accordance with various embodiments.

With reference to FIGS. 7A, 7B, and 7C, an adjustable leg restraint 520 configured to rotate about a pivot joint is illustrated, in accordance with various embodiments. Adjustable leg restraint 520 may include a leg guard 522, similar to leg guard 122 in FIG. 2A. In various embodiments, ejection seat 100, with momentary reference to FIG.

1B, may include adjustable leg restraint 520 in place of adjustable leg restraint 120. Leg guard 522 may be coupled to side panel 106 via a pivot joint 504. In the nonextended state (FIG. 7A), leg guard 522 may be located horizontally adjacent to side panel 106 and/or within a cavity defined by side panel 106.

Leg guard 522 may be configured to translate about pivot joint 504 and relative to side panel 106. In various embodiments, a torsion spring 505 may apply a biasing force F2 to leg guard 522. Biasing force F2 is configured to cause leg guard 522 to rotate about pivot joint 504. In various embodiments, the axis of rotation of leg guard 522 about pivot joint 504 is generally perpendicular to surface 156 of side panel 106. As used in the previous context "generally perpendicular" means ±5° from perpendicular. In the nonextended state, a restraint pin 550 may contact leg guard 522, thereby generating an interference that limits rotation of leg guard 522 about pivot joint 504. In various embodiments, restraint pin 550 may be located in a pin channel 564 defined by leg guard 522. In this regard, adjustable leg restraint 520 is configured to be in the nonextended state (FIG. 7A) when restraint pin 550 is located in pin channel 564. Removing restraint pin 550 from pin channel 564 removes the interference, thereby allowing leg guard 522 to begin rotation about pivot joint 504.

In various embodiments, restraint pin 550 may be stationary. In this regard, restraint pin 550 may be coupled to a structure, for example, aircraft floor 503, that remains stationary during the expulsion of ejection seat 100 from cockpit 16, with momentary reference to FIG. 1A. Upon initiation of the ejection sequence, ejection seat 100 and side panel 106 translate away from aircraft floor 503 and stationary restraint pin 550. As ejection seat 100 and side panel 106 move away from aircraft floor 503 (i.e., in the direction of arrow 553), stationary restraint pin 550 translates out of pin channel 564. Removing stationary restraint pin 550 from pin channel 564 allows leg guard 522 to begin rotating about pivot joint 504. Leg guard 522 rotates about pivot joint 504 until surface 525 of leg guard 522 contacts surface 151 of side panel 106. Stated differently, and with combined reference to FIGS. 1A and 7C, leg guard 522 may translate to the extended state (FIG. 7C) in response to ejection seat 100 translating toward canopy 20. In the extended state, an end 527 of leg guard 522 may be located above the leg of occupant 14. Locating end 527 above the occupant's leg, allows leg guard 522 to contact any portions of canopy 20 remaining over the occupant's leg prior to the legs contacting the canopy.

Figure 8A:
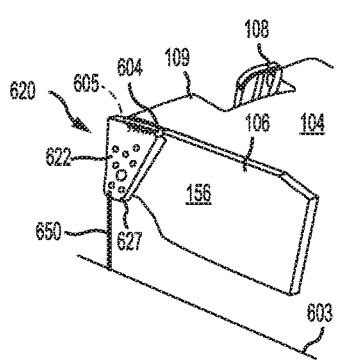
FIG. 8A illustrates a perspective view of an adjustable leg restraint in a nonextended state, in accordance with various embodiments.
Figure 8B:
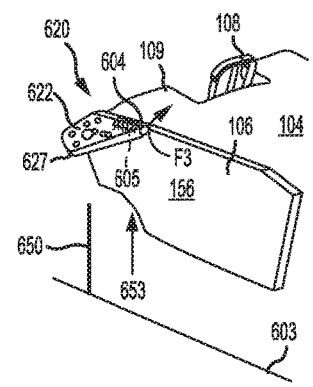
FIG. 8B illustrates a perspective view of an adjustable leg restraint in a partially extended state, in accordance with various embodiments.
Figure 8C:
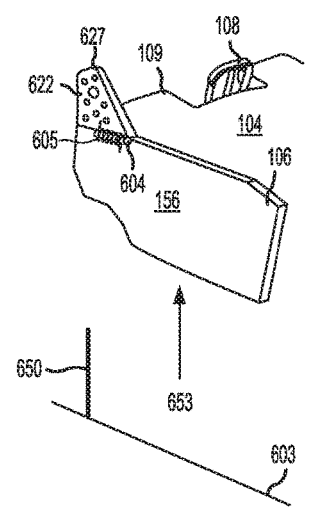
FIG. 8C illustrates a perspective view of an adjustable leg restraint in an extended state, in accordance with various embodiments.

With reference to FIGS. 8A, 8B, and 8C, an adjustable leg restraint 620 configured to rotate about a pivot joint is illustrated, in accordance with various embodiments. Adjustable leg restraint 620 may include a leg guard 622, similar to leg guard 122 in FIG. 2A. In various embodiments, ejection seat 100, with momentary reference to FIG. 1B, may include adjustable leg restraint 620 in place of adjustable leg restraint 120. Leg guard 622 may be coupled to side panel 106 via a pivot joint 604. In the nonextended state (FIG. 8A), leg guard 622 may be located horizontally adjacent to side panel 106.

Leg guard 622 may be configured to translate about pivot joint 604 and relative to side panel 106. In various embodiments, a torsion spring 605 may apply a biasing force F3 to leg guard 622. Biasing force F3 is configured to cause leg guard 622 to rotate about pivot joint 604. In various embodiments, the axis of rotation of leg guard 622 about pivot joint 604 is generally parallel to surface 156 of side panel 106. As used in the previous context "generally parallel" means ±5° from parallel. For example, in the partially extended state of FIG. 8B, leg guard 622 may be perpendicular to surface 156 of side panel 106.

In the nonextended state (FIG. 8A), a restraint pin 650 may contact leg guard 622, thereby generating an interference that limits rotation of leg guard 622 about pivot joint 604. In various embodiments, restraint pin 650 may be stationary. In this regard, restraint pin 650 may be coupled to a structure, for example, aircraft floor 603, that remains stationary during the expulsion of ejection seat 100 from cockpit 16, with momentary reference to FIG. 1A. Upon initiation of the ejection sequence, ejection seat 100 and side panel 106 translate away from aircraft floor 603 and restraint pin 650. As side panel 106 and leg guard 622 move away from aircraft floor 603 (i.e., in the direction of arrow 653), leg guard 622 translates out of contact with restraint pin 650. Stated differently, translating leg guard 622 in the direction of arrow 653 removes the interference between restraint pin 650 and leg guard 622. Removing the interference between restraint pin 650 and leg guard 622 allows leg guard 622 to begin rotating about pivot joint 604. In various embodiments, restraint pin 650 may be coupled to an actuator, similar to actuator 370 in FIG. 5B, configured to pull or otherwise translate restraint pin 650 away from leg guard 622 in response to actuation of ejection handle 108.

With combined reference to FIGS. 1A and 8C, leg guard 622 may translate to the extended state, in response to ejection seat 100 translating toward canopy 20. In the extended state, an end 627 of leg guard 622 may be located above the leg of occupant 14 such that leg guard 622 contacts any portions of canopy 20 remaining over the occupant's leg prior to the leg contacting canopy 20.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosures. The scope of the disclosures is accordingly to be limited by nothing other than the appended claims and their legal equivalents, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is intended to invoke 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. An adjustable leg restraint for an ejection seat, comprising:
    a leg guard;
    an extension flange coupled to the leg guard and configured to translate the leg guard relative to a side panel of the ejection seat;
    a spring configured to apply a biasing force to the extension flange;
    a restraint pin located in a pin channel defined by the extension flange; and
    an actuator operably coupled between the restraint pin and an ejection handle of the ejection seat, wherein the actuator is configured to remove the restraint pin from the pin channel in response to an actuation of the ejection handle.

2. The adjustable leg restraint of claim 1, further comprising:
    a first guide flange coupled to the leg guard; and
    a first stop located through a first interior track defined by the first guide flange.

3. The adjustable leg restraint of claim 2, further comprising:
    a second guide flange coupled to the leg guard; and
    a second stop located through a second interior track defined by the second guide flange.

4. The adjustable leg restraint of claim 3, wherein the leg guard comprises a shark fin shape and defines a plurality of orifices.

5. An ejection seat, comprising:
    a seat pan;
    a side panel located adjacent the seat pan; and
    an adjustable leg restraint coupled to the side panel, the adjustable leg restraint comprising:
        a leg guard,
        an extension flange coupled to the leg guard and configured to translate the leg guard relative to the side panel;
        a guide flange coupled to the leg guard; and
        a stop coupled to the side panel, wherein the stop is located through an interior track defined by the guide flange.

6. The ejection seat of claim 5, wherein the leg guard comprises a shark fin shape and defines a plurality of orifices.

7. The ejection seat of claim 5, further comprising a restraint pin located through an opening defined by the extension flange.

8. The ejection seat of claim 7, wherein the side panel defines a plurality of channels configured to receive the restraint pin.

9. The ejection seat of claim 5, further comprising a spring configured to apply a biasing force to the extension flange.

10. The ejection seat of claim 9, further comprising:
    a restraint pin located in a pin channel defined by the extension flange; and
    an actuator configured to remove the restraint pin from the pin channel.

11. The ejection seat of claim 10, further comprising an ejection handle configured to activate an ejection sequence, wherein the actuator is configured to remove the restraint pin in response to an actuation of the ejection handle.

12. The ejection seat of claim 5, further comprising:
    a leg guard actuator operably coupled to the extension flange, wherein the leg guard actuator is configured to drive a translation of the extension flange relative to the side panel;
    a rail coupled to the seat pan and configured to support a translation of the seat pan along the rail; and
    a seat pan actuator operably coupled to the seat pan, wherein the seat pan actuator is configured to drive the translation of the seat pan along the rail, and wherein the leg guard actuator is configured to translate the extension flange in response to the translation of the seat pan along the rail.

13. The ejection seat of claim 12, further comprising a control panel including a controller operably coupled to the seat pan actuator.

14. An ejection seat configured to be expelled from a cockpit, comprising:
    a seat pan;
    a side panel located adjacent the seat pan; and
    an adjustable leg restraint coupled to the side panel, the adjustable leg restraint comprising:
        a leg guard coupled to the side panel via a pivot joint, and
        a torsion spring operationally coupled to the leg guard, wherein the torsion spring is configured to rotate the leg guard about the pivot joint, and wherein the leg guard is configured to rotate about the pivot joint until a surface of the leg guard contacts the side panel.

15. The ejection seat of claim 14, further comprising a restraint pin configured to limit rotation of the leg guard about the pivot joint.

16. The ejection seat of claim 15, wherein the restraint pin is coupled to a floor of the cockpit.

17. The ejection seat of claim 16, wherein the leg guard comprises a shark fin shape and defines a plurality of orifices.

18. The ejection seat of claim 14, wherein an axis of rotation of the leg guard about the pivot joint is generally parallel to a surface of the side panel, the surface of the side panel being oriented away from the seat pan.

19. The ejection seat of claim 14, wherein an axis of rotation of the leg guard about the pivot joint is generally perpendicular to a surface of the side panel, the surface of the side panel being oriented away from the seat pan.

* * * * *